United States Patent
Du et al.

(10) Patent No.: US 11,657,521 B2
(45) Date of Patent: May 23, 2023

(54) 3D IMAGING METHODS, DEVICES AND DEPTH CAMERAS

(71) Applicant: Rayz Technologies Co. Ltd., Beijing (CN)

(72) Inventors: Detao Du, Beijing (CN); Ruxin Chen, Beijing (CN)

(73) Assignee: Rayz Technologies Co. Ltd., Bejing (CN)

( * ) Notice: Subject to any disclaimer, the term of this patent is extended or adjusted under 35 U.S.C. 154(b) by 359 days.

(21) Appl. No.: 17/010,733

(22) Filed: Sep. 2, 2020

(65) Prior Publication Data

US 2021/0074009 A1   Mar. 11, 2021

(30) Foreign Application Priority Data

Sep. 9, 2019   (CN) .......................... 201910847124.6

(51) Int. Cl.
*G06T 7/50* (2017.01)
*H04N 23/56* (2023.01)
*H04N 25/76* (2023.01)

(52) U.S. Cl.
CPC .............. *G06T 7/50* (2017.01); *H04N 23/56* (2023.01); *H04N 25/76* (2023.01); *G06T 2207/10028* (2013.01)

(58) Field of Classification Search
CPC ............ G06T 7/50; G06T 2207/10028; H04N 5/2256; H04N 5/374
See application file for complete search history.

(56) References Cited

U.S. PATENT DOCUMENTS

| | | | | |
|---|---|---|---|---|
| 7,551,771 | B2* | 6/2009 | England, III | G06T 7/593 382/154 |
| 9,723,233 | B2* | 8/2017 | Grauer | H01L 27/14609 |
| 10,116,883 | B2* | 10/2018 | Ayyagari | G01S 17/36 |
| 10,547,830 | B2* | 1/2020 | Ovsiannikov | G01B 11/2513 |
| 10,841,491 | B2* | 11/2020 | Mathy | H04N 5/232411 |
| 2012/0154535 | A1* | 6/2012 | Yahav | H01L 27/14812 348/46 |
| 2019/0164257 | A1* | 5/2019 | Zhang | G06T 5/002 |
| 2019/0295279 | A1* | 9/2019 | Wang | G01B 11/2518 |

* cited by examiner

*Primary Examiner* — Gregory M Desire
(74) *Attorney, Agent, or Firm* — Sunstein LLP

(57) ABSTRACT

The present application discloses a 3D imaging method, device and depth camera, wherein, the 3D imaging method includes: acquiring depth information of points in a to-be-captured scene corresponding to at least one pixel; generating a 3D image of the to-be-captured scene based on the acquired depth information; and determining the depth information of the each of the points in the to-be-captured scene corresponding to the at least one pixel based on a result of the distributing. This implementation utilizes multiple charge collection areas to collect the charges obtained by photoelectric conversion of the light that reaches the pixels, thereby achieving the capture of the depth information of points in the to-be-captured scene corresponding to each pixel.

20 Claims, 12 Drawing Sheets

3D IMAGING METHODS, DEVICES AND DEPTH CAMERAS

CROSS-REFERENCE TO RELATED APPLICATION

This application claims benefit of priority to Chinese Patent Application No. 201910847124.6 filed on Sep. 9, 2019 before the China National Intellectual Property Administration, the entire disclosure of which is incorporated herein by reference in its entity.

TECHNICAL FIELD

The embodiments of the present application relate to a field of image processing, in particular to a field of 3D imaging. To be specific, the embodiments of the present application relate to 3D imaging methods, devices and depth cameras.

BACKGROUND

With the development of computer software and hardware technology, more and more applications rely on 3D (Three Dimension) information. For example, in the field of autonomous driving, 3D reconstruction of the environment in which autonomous vehicles are located is required to provide a basis for decision-making of autonomous vehicles. In addition, in applications such as virtual reality (VR) games, it is also necessary to accurately calculate the user's 3D position, so as to more accurately implant the user in the 3D virtual scene.

The so-called 3D information may be understood as 3D position information of each pixel in the scene in a certain preset 3D coordinate system. For example, if the preset 3D coordinate system is the world coordinate system, in order to obtain the 3D position information of each pixel in the scene, it is possible to first determine the depth information of each pixel in the scene in the camera coordinate system of the camera that took the scene image, and then the depth information is transformed according to the pose of the camera in the world coordinate system, so as to obtain the 3D position information of each pixel in the world coordinate system.

Therefore, how to accurately obtain the depth information of the points in the to-be-captured scene corresponding to each pixel in the image has become an urgent problem to be solved.

In the prior art, there are various methods for measuring the depth of the scene. The basic principle is to use Time of Flight (ToF) to measure the distance.

For example, one method is to use a ToF camera to measure the distance. It sends a modulated signal and uses multiple elements associated with a single photosensitive pixel to obtain a phase shift of the return signal relative to the transmitted signal at significantly different phases (different times, no overlap) of the modulated signal to determine the distance. The disadvantage of this method is that the measurement range is limited by the distance traveled by the light in the modulation period.

Another method is to use the Pockels cell as a modulator to modulate the transmission of the received signal from the scene to determine the distance of the object in the scene. This method is limited by the smaller Field of View (FOV) of the nonlinear crystal and the higher operating voltage.

SUMMARY

The embodiments of the present application propose 3D imaging methods, devices and depth cameras.

In a first aspect, an embodiment of the present application provides a 3D imaging method, including: acquiring depth information of the points in a to-be-captured scene corresponding to at least one pixel; generating a 3D image of the to-be-captured scene based on the acquired depth information; wherein, for each of the points in the to-be-captured scene corresponding to the at least one pixel, the depth information is obtained by: distributing, during the exposure period, charges obtained by the pixel by photoelectric conversion of received light reflected by each of the points in the scene to at least two charge collection areas associated to the pixel according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and determining, based on a result of the distributing, the depth information of the each of the points in the to-be-captured scene corresponding to the at least one pixel.

In some embodiments, each of the pixels, from which the depth information is obtained, has at least two charge collection areas; and wherein determining, based on a result of the distributing, the depth information of the each of the points in the to-be-captured scene corresponding to the at least one pixel includes: determining, based on an amount of charge collected in the at least two charge collection areas of the pixel, the depth information of the points in the to-be-captured scene corresponding to each pixel.

In some embodiments, determining, based on a result of the distributing, the depth information of the each of the points in the to-be-captured scene corresponding to the at least one pixel includes: determining, during an exposure period, a number of charges collected in the at least two charge collection areas of the pixel; and determining, based on the determined number, the depth information of the points in the scene corresponding to the pixel.

In some embodiments, an intersection of a time period, during which an illumination light emitted by an illumination source is reflected to an image capture device by the points in the to-be-captured scene, and a time period for exposure of the device is not empty.

In some embodiments, the illumination light has a short pulse width, e.g. shorter than or equal to 10 ns.

In some embodiments, the illumination light has a long pulse width, e.g. longer than 10 ns.

In some embodiments, the distribution rule is determined by: applying a voltage to control electrodes of each of the charge collection areas, wherein the applied voltage has different voltage-time variation functions from each other; determining a variation of the charge distribution over time under the applied voltage; and determining the variation as the distribution rule.

In a second aspect, an embodiment of the present application also provides a depth camera, including: an image sensor, having a plurality of sensing pixel units, each sensing pixel unit collects light signals of points in a to-be-captured scene; a photoelectric converter, including a photoelectric conversion unit corresponding to each sensing pixel unit, and each photoelectric conversion unit is used to convert the light signal collected by each pixel into electric charge; a charge collector, including a charge collection unit corresponding to each of the sensing pixel units, and each charge collection unit is used to determine an amount of electrical signal obtained via photoelectric conversion of the photoelectric converter, wherein the charge collection unit has at least one first charge collection unit, and the first charge collection unit includes at least two charge collection areas and distributes charges obtained by the photoelectric conversion to the charge collection areas of the charge collection unit according to a preset distribution rule, and wherein the distribution rule is used to determine the charge collection variation functions of changes over time of a ratio of an amount of charges collected in each charge collection area to a total amount of charge collected in all charge collection areas of the charge collection unit per unit time, and wherein for a same pixel, the variation functions are different from each other; a processor, configured to determine the depth information of the points in the to-be-captured scene corresponding to the pixels having at least two charge collection areas based on a result of the distributing.

In some embodiments, each charge collection unit comprises at least two charge collection areas; and wherein the processor further determines the depth information of the points in the to-be-captured scene corresponding to the pixel based on a number of charges collected by the at least two charge collection areas of the pixel.

In some embodiments, the depth camera further includes a shutter; the processor is further configured to: determine a number of charges collected by the at least two charge collection areas of the pixel during an exposure period, and determine the depth information of the points in the to-be-captured scene corresponding to the pixel based on the determined number of the collected charges, wherein the exposure period is a period from a time when the shutter is opened to when the shutter is closed; at a first moment when the shutter is opened, at least part of the illumination light has not yet returned to the image sensor from the to-be-captured scene; and at a second moment when the shutter is closed, at least part of the illumination light has returned to the image sensor from the to-be-captured scene.

In some embodiments, the depth camera further includes an illumination source that emits illumination light.

In some embodiments, the distribution rule is determined by: applying a voltage to control electrodes of each of the charge collection areas, wherein the applied voltage has different voltage-time variation functions from each other; determining a variation of the charge distribution over time under the applied voltage; and determining the variation as the distribution rule.

In some embodiments, each of the sensing pixel units is selected from group consisting of a charge coupled device unit and a CMOS sensor unit.

In a third aspect, an embodiment of the present application also provides a 3D imaging device, including: a capture unit, configured to acquire depth information of the points in a to-be-captured scene corresponding to at least one pixel; a 3D image generating unit, configured to generate a 3D image of the to-be-captured scene based on the acquired depth information; wherein, for each of the points in the to-be-captured scene corresponding to the at least one pixel, the depth information is obtained by: distributing, during the exposure period, charges obtained by the pixel by photoelectric conversion of received light reflected by each of the points to at least two charge collection areas according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and determining, based on a result of the distributing, the depth information of the each of the points in the to-be-captured scene corresponding to the at least one pixel.

In some embodiments, each of the pixels, from which the depth information is obtained, has at least two charge collection areas; and wherein determining, based on a result of the distributing, the depth information of the each of the points in the to-be-captured scene corresponding to the at least one pixel includes: determining, based on an amount of charge collected in the at least two charge collection areas of the pixel, the depth information of the points in the to-be-captured scene corresponding to each pixel.

In some embodiments, determining, based on a result of the distributing, the depth information of the each of the points in the to-be-captured scene corresponding to the at least one pixel includes: determining, during an exposure period, a number of charges collected in the at least two charge collection areas of the pixel; and determining, based on the determined number, the depth information of the points in the scene corresponding to the pixel.

In some embodiments, an intersection of a time period, during which an illumination light emitted by an illumination source is reflected to an image capture device by the points in the to-be-captured scene, and a time period for exposure of the device is not empty.

In some embodiments, the illumination light has a short pulse width, i.e. shorter than or equal to 10 ns.

In some embodiments, the illumination light has a long pulse width, i.e. longer than 10 ns.

In some embodiments, the distribution rule is determined by: applying a voltage to control electrodes of each of the charge collection areas, wherein the applied voltage has different voltage-time variation functions from each other; determining a variation of the charge distribution over time under the applied voltage; and determining the variation as the distribution rule.

In a fourth aspect, an embodiment of the present application provides an electronic device, including: one or more processors; and a storage device storing one or more programs executable by the one or more processors to implement the method described in the first aspect.

In the fifth aspect, an embodiment of the present application provides a computer-readable storage medium having a computer program stored thereon, wherein the program is executable by a processor to implement the method described in the first aspect.

The 3D imaging solution and depth camera provided by the embodiments of the present application generate a 3D image of the to-be-captured scene according to the depth information of the points in the to-be-captured scene corresponding to the pixels, and obtain the depth information of each point in the to-be-captured scene corresponding to each pixel by: distributing, during the exposure period, charges obtained by the pixel by photoelectric conversion of received light reflected by each of the points to at least two charge collection areas according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and determining, based on a result of the distributing, the depth information of the each of the points in the to-be-captured scene corresponding to the at least one pixel. The above method of acquiring depth information utilizes the difference in the ratio of the number of charges collected by multiple charge collection areas for a certain pixel at different times during the exposure, so that the electrical signal after photoelectric conversion can not only characterize the level of exposure of the pixel, but also represent the depth information of the points in the to-be-captured scene corresponding to the pixel, so that the depth information of each point in the to-be-captured scene can be acquired. The variation functions can be periodic functions for detecting specific range of depth information.

BRIEF DESCRIPTION OF THE DRAWINGS

By reading the detailed description of the non-limiting embodiments with reference to the following drawings, other features, purposes and advantages of the present application will become more apparent.

DETAILED DESCRIPTION OF EMBODIMENTS

Figure 1:
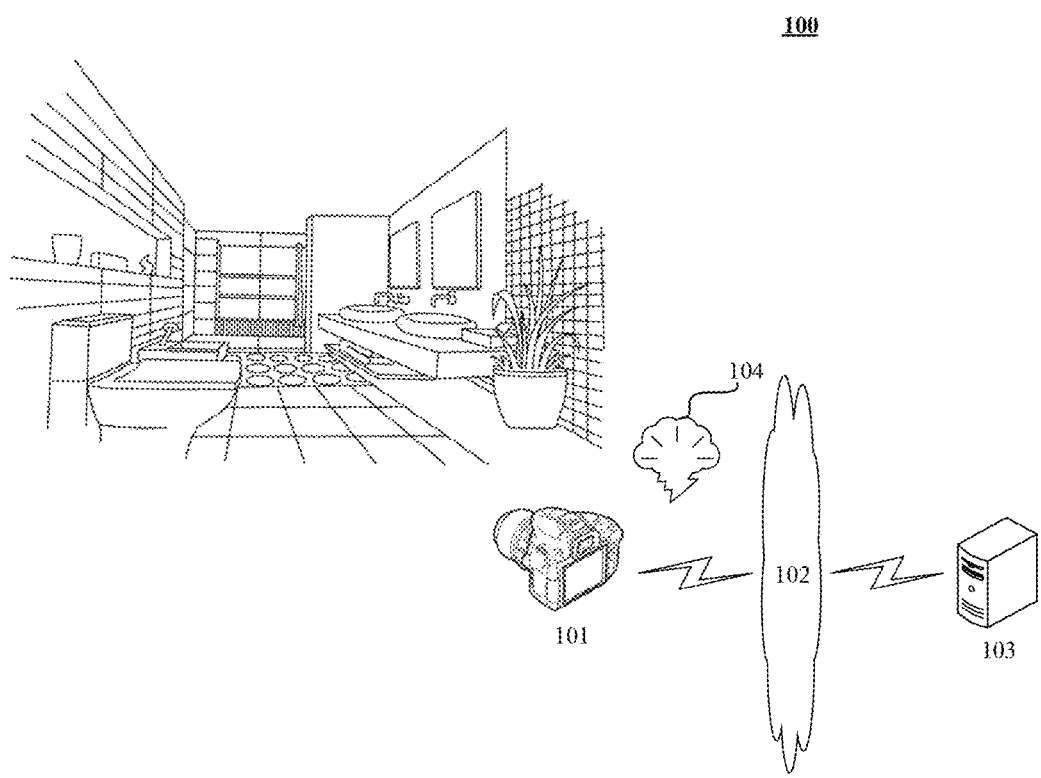
FIG. 1 is an exemplary system architecture diagram in which a 3D imaging method according to an embodiment of the present application may be applied.

The application will be further described in detail below with reference to the drawings and embodiments. It can be understood that the specific embodiments described herein are only used to explain the related invention, but not to limit the invention. In addition, it should be noted that, for ease of description, only the parts related to the relevant invention are shown in the drawings.

It should be noted that the embodiments in this application and the features in the embodiments can be combined with each other unless there is no conflict. Hereinafter, the present application will be described in detail with reference to the drawings and in conjunction with embodiments.

It should be noted that the modifications of "a" and "a plurality of" mentioned in the present disclosure are illustrative and not restrictive. Those skilled in the art should understand that unless the context clearly indicates otherwise, they should be understood as "one or more."

FIG. 1 shows an exemplary system architecture 100 in which an embodiment of the 3D imaging method or 3D imaging device of the present application can be applied.

As shown in FIG. 1, the system architecture 100 may include an image capture device 101, a network 102, a server 103, and an illumination source 104. The network 102 is used to provide a medium of a communication link between the image capture device 101 and the server 103. The network 102 may include various connection types, such as wired, wireless communication links, or fiber optic cables.

The user may use the image capture device 101 to interact with the server 103 via the network 102 to generate a 3D image. For example, the user may use the illumination provided by the illumination source 104 to use the image capture device 101 to capture the to-be-captured scene, so as to obtain the depth information of each of the points in the scene.

The server 103 may be a server that provides various services, such as an image processing server that generates a 3D image based on the depth information of the to-be-captured scene, which is sent by the image capture device 101, or the original data from which the depth information is to be calculated. The image processing server may perform calculations based on the received data, and generate a calculation result (for example, a 3D image of the to-be-captured scene).

It should be noted that the 3D imaging method provided by the embodiment of the present application may be executed by the server 103, or may be executed by the image capture device 101, or part of the 3D imaging method may be executed by the server 103 and the other part thereof may be executed by the image capture device 101. Accordingly, the 3D imaging device may be disposed in the server 103, or may be disposed in the image capture device 101, or part of the 3D imaging device may be disposed in the server 103 and the other part thereof may be disposed in the image capture device 101.

It should be understood that if the 3D imaging method provided by the embodiment of the present application is only executed by the image capture device 101, the architecture shown in FIG. 1 may not include a network and a server. In addition, the number of image capture devices, networks, and servers in FIG. 1 is only illustrative. According to implementation needs, there may be any number of image capture devices, networks and servers. For example, the server may be a clustered server, including multiple servers deployed with different processes.

Figure 2:
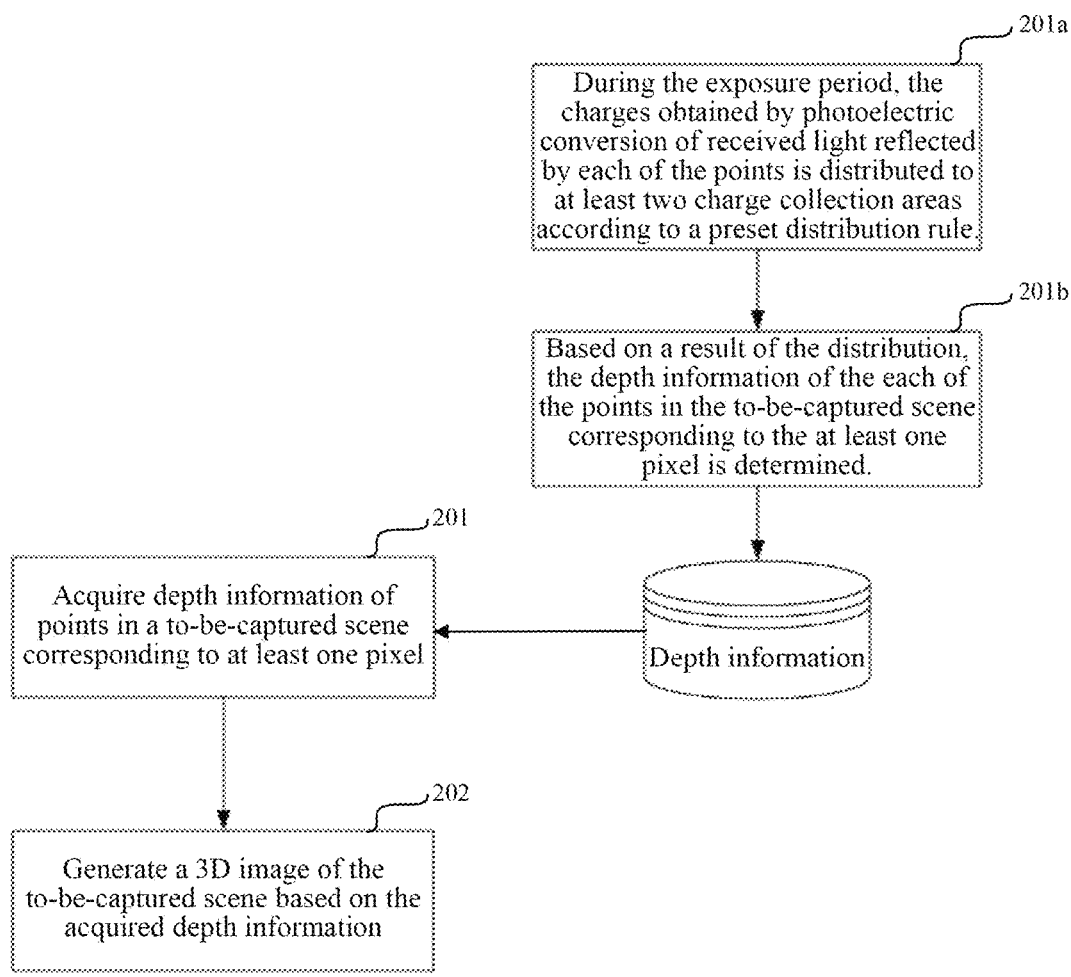
FIG. 2 is a flowchart of an embodiment of a 3D imaging method according to the present application.

Continuing to refer to FIG. 2, a process 200 of an embodiment of the 3D imaging method according to the present application is illustrated therein.

The 3D imaging method includes the following steps.

In step 201, the depth information of the points in a to-be-captured scene corresponding to at least one pixel is acquired.

Here, the to-be-captured scene may be understood as an environment area where it is desired to obtain an image. It is understandable that the to-be-captured scene can be determined by the pose and the angle of view of the image capture device.

Those skilled in the art may understand that, during the imaging process, the light emitted by the point in the to-be-captured scene reflecting the illumination source forms a reflected light. After the reflected light is captured by the receiving device (for example, lens) of the image capture device (for example, camera), it can be imaged as a pixel in the image. The intensity of the pixels may represent the brightness information of the points in the to-be-captured scene.

In this embodiment, for the points in the to-be-captured scene corresponding to each pixel, the depth information may be specifically obtained by the following manner.

In step 201a, during the exposure period, the charges obtained by photoelectric conversion of the light reflected by the points are distributed to at least two charge collection areas according to a preset distribution rule.

Here, the distribution rule is used to determine the charge collection variation functions of the changes over time of a ratio of an amount of charge collected in each charge collection area to a total amount of charges collected in all charge collection area per unit time. Moreover, for the same pixel, variation functions of each charge collection area are different from each other.

A photoelectric converter is provided in the image capture device. The photoelectric converter converts optical signals into electrical signals. In this way, the image information of the points in the to-be-captured scene may be restored by processing the electrical signal.

Specifically, by controlling the shutter, the image capture device may enter the exposure stage. During the exposure period, after the light emitted by the illumination source is reflected by various points in the to-be-captured scene, the resulting reflected light may enter the photoelectric converter through the lens of the image capture device.

For general 2D imaging, after photoelectric conversion is performed on the light incident from the to-be-captured scene, the optical signal may be converted into an electrical signal. Here, the signal value of the electrical signal may be characterized by, for example, the amount of charge obtained after photoelectric conversion of the optical signal. For the determined photoelectric converter, the functional relationship between the optical signal and the electrical signal before and after the photoelectric conversion is also known. Thus, by detecting the signal value of the electrical signal, the signal value of the optical signal may be restored, and then the light intensity of each of the points in the to-be-captured scene may be obtained.

In order to further obtain the depth information of the points in the to-be-captured scene on the basis of 2D imaging, it is not enough to only obtain the amount of charge obtained after photoelectric conversion of the light signal. Therefore, in the 3D imaging method of this embodiment, for a point in the to-be-captured scene, charges obtained by photoelectric conversion of light reflected by the point may be distributed to at least two charge collection areas according to a preset distribution rule, so as to collect the charges obtained by photoelectric conversion.

Here, the distribution rule is used to determine the charge collection variation function of the changes over time of a ratio of an amount of charges collected in each charge collection area to a total amount of charges collected in all charge collection area per unit time. Moreover, for the same pixel, the charge collection variation functions of each charge collection area are different from each other. In other words, for a certain pixel p, if two charge collection areas A and B are provided for the pixel p, then the variation functions of the two charge collection areas are different. In this way, since the variation functions of the charge collection area A and the charge collection area B changes with time t, according to the amount of charges actually collected by the two charge collection areas, the ratio of the amount of charges actually collected by the two charge collection areas can be determined, so that the time when the light reaches the photoelectric converter may be calculated according to the variation functions. Further, the propagation speed of light is known, and the distance from the point to the image capture device may be calculated by determining the time when the light emitted by the pixel reaches the photoelectric converter.

It can be understood that, for a pixel, the sum of the amount of charges collected in all the charge collection areas of the pixel is the total amount of charges obtained by photoelectric conversion of the reflected light from the point corresponding to the pixel in the scene, correspondingly in particular, for this pixel, the sum of the ratios of the amount of charges collected by each charge collection area to the total amount of charges obtained by photoelectric conversion is 1, ignoring a small loss of the charge during transportation. That is to say, although multiple charge collection areas are provided for the pixel, the total amount of charge collected by each charge collection area has not been reduced, thereby ensuring the restoration of brightness information of the points in the scene to which the pixel corresponds.

Step 201b, based on the distribution result, the depth information of the points in the scene corresponding to the pixel is determined.

For example, in some application scenarios, two charge collection areas a and b are used to collect the charges converted by the photoelectric converter. In addition, in the pre-set distribution rules, the function that the collection ratio of the charge collection area A changes over time is $y_1=f_1(t)$, and the function that the collection ratio of the charge collection area B changes over time is $y_2=f_2(t)$, and $f_1(t)$ or $f_2(t)$ is a monotonic function. Since there are two charge collection areas, $f_2(t)=1-f_1(t)$, since one of $f_1(t)$ or $f_2(t)$ is a monotonic function, and the other of them must also be monotonic function. Suppose that the illumination source emits a pulsed light at t=0, and the pulse width of the pulsed light is $\Delta t$. Then, in a certain time period from $t_1$ to $t_2$, the photosensitive area (photoelectric converter) of a certain pixel can collect the reflected light returned from a certain point in the scene. And after the reflected light undergoes photoelectric conversion, the total charge Q is generated.

In this case, if the number of charges collected in the charge collection area A is $Q_1$, and during this period, the number of charges collected in the charge collection area B is $Q_2$, then it can, based on the measured $Q_1$, $Q_2$ and the previously known $t_1$, $t_2$, $f_1(t)$, $f_2(t)$ and the light intensity of the illumination source, calculate the specific value of the light flight time tof. Here, $t_1$ and $t_2$ are the exposure start time and the exposure end time, respectively, q(t) is the number of charges generated after photoelectric conversion per unit time, and q(t) is proportional to the light intensity.

$$Q_1 = \int_{t_1}^{t_2} q(t)f_1(t)dt$$

$$Q_2 = \int_{t_1}^{t_2} q(t)f_2(t)dt \quad (1)$$

Although the above formula (1) does not explicitly reflect the beginning and ending time of the period during which the reflected light can be collected by a certain charge collection area, since the above $Q_1$ and $Q_2$ can be collected, and $f_1(t)$, $f_2(t)$ and q(t) are also known, it can be determined according to the above formula (1) that, the area that under the curve $q(t)f_1(t)$ between the start and the end time is $Q_1$ and under the curve $q(t)f_2(t)$ between the start and the end time is $Q_2$, and the optical flight time tof is further calculated according to the determined start and end time.

Here, tof characterizes the time from the moment when the illumination source starts to emit light (t=0) to the moment when the pixel receives the reflected light, and this time includes the time from the moment when the light starts from the illumination source to the moment when the light reaches a certain point in the scene (set to $t_{11}$), and the time from the moment the light leaves the point to the moment the light is collected by the charge collection area after photoelectric conversion (set to $t_{12}$). That is to say:

$$tof = t_{11} + t_{12} \quad (2)$$

When calculating the depth information, what we need is the distance between the point in the scene and the image capture device, i.e., the distance traveled by the reflected light in the above formula (2) during the $t_{12}$ period. Hereinafter, in conjunction with FIG. 2A and FIG. 2B, how to calculate $t_{12}$ from the above formula (2) will be further explained.

Figure 2A:
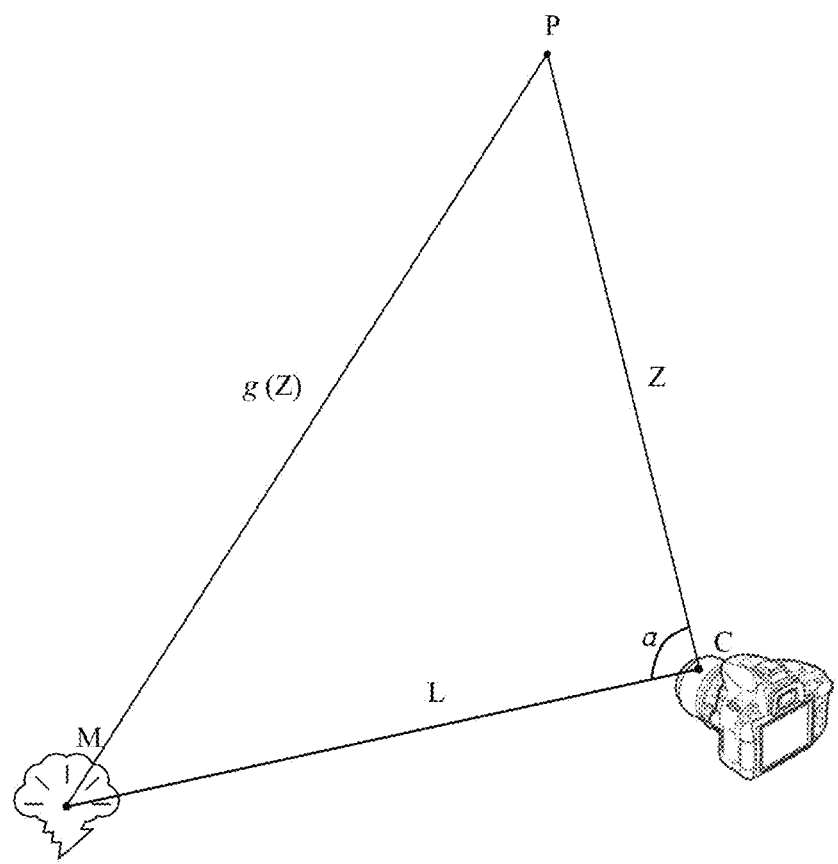
FIG. 2A is a light path diagram of light propagating from the illumination source to the point in the to-be-captured scene and then to the image capture device in an alternative implementation.

As shown in FIG. 2A, assuming that the distance L between the light source M and the image capture device C is known, and assuming that the angle between MC and CP is α (P is a certain point in the scene), PC=Z, PM=g (Z), then:

$$g^2(z) = L^2 + Z^2 - 2L \cdot Z \cdot \cos \alpha \quad (3)$$

In the above formula (3), L is a known quantity, and the included angle α can also be calibrated in advance. For example, on the premise that the pose of the image capture device and the pose of the illumination source are respectively the same as the pose of the image capture device and the pose of the illumination source in the 3D imaging method of this embodiment, the to-be-captured scene may be photographed, and the included angle α of each point in the scene may be calibrated.

Figure 2B:
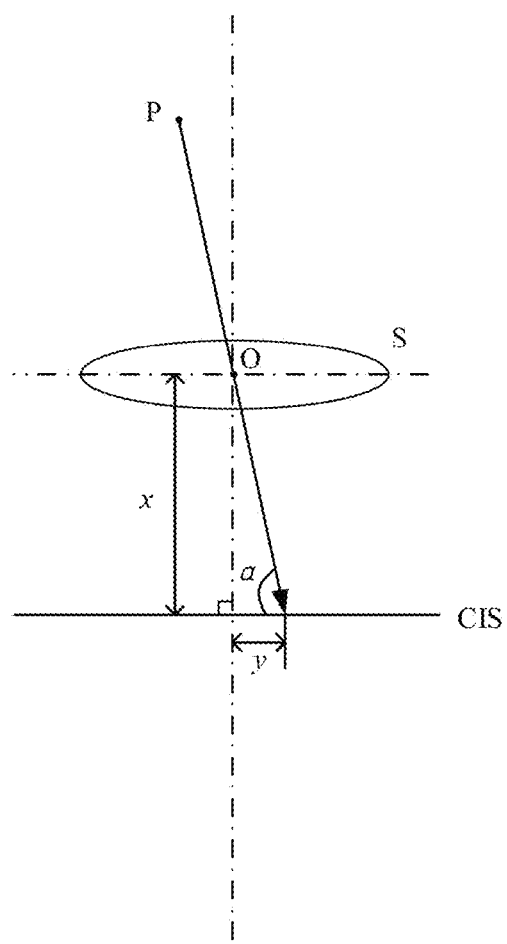
FIG. 2B is a light path diagram of light propagating from the lens of the image capture device to the imaging plane of the image capture device.

For example, referring to FIG. 2B, if the connection line between the illumination source and the image capture device (for example, the optical center of the lens of the image capture device) is in the imaging plane of the image capture device, then, for the known image capture device, the distance x from the optical center O of the lens S to the imaging plane CIS is known. In addition, according to the position of the pixel corresponding to the point P in the imaging plane CIS, y can be determined. From this, the value of a can be calculated.

On the other hand, according to the above formula (2), since tof has been measured and the following formula (4) is met, the depth information of the points P in the scene is then obtained.

$$g(Z) + Z = (t_{11} + t_{12}) \cdot C = tof \cdot C \quad (4)$$

Where C is the speed of light. Combining the above formula (3) and formula (4), Z can be solved.

In addition, in some optional implementations, if the distance between the illumination source and the image capture device is much smaller than the distance between the two and any point in the scene, then g $(Z) \approx Z$ can be considered. At this time, correspondingly, $t_{11} \approx t_{12}$. Furthermore, it can be considered that $t_{11} \approx 0.5 \cdot tof$ Correspondingly, $Z \approx 0.5 \cdot tof \cdot C$.

It is understandable that in these alternative implementations, in order to facilitate obtaining the accurate depth information, the illumination source can be set on the image capture device, that is, the distance between the illumination source and the image capture device is nearly zero. At this time, $Z = 0.5 \cdot tof \cdot C$.

Step 202: a 3D image of the to-be-captured scene is generated based on the acquired depth information.

Using the above steps 201a to 201b, the depth information of each point in the scene corresponding to each pixel can be obtained.

According to the above steps 201a to 201b, the depth information of the points in the to-be-captured scene corresponding to each pixel can be obtained. Thus, a 3D image of the to-be-captured scene can be generated.

It is understandable that 3D images can have different manifestations. For example, in some optional implementations, the depth information of each point in the to-be-captured scene corresponding to each pixel can be mapped to a color value corresponding to the depth value indicated by the depth information, and each pixel of the 2D image is correspondingly superimposed with a color value as a 3D image of the to-be-captured scene.

Or, in other optional implementations, based on the spatial position of each point in the scene, and the depth information of each point in the to-be-captured scene corresponding to the pixel, it performs three-dimensional reconstruction of the to-be-captured scene, and uses the result of the three-dimensional reconstruction as a 3D image of the to-be-captured scene.

Or, in other optional implementations, the depth information of each point in the to-be-captured scene corresponding to each pixel and the exposure intensity of each pixel may be stored correspondingly. The depth information and the exposure intensity of each point in the scene are used as the 3D image of the to-be-captured scene.

The 3D imaging method provided in this embodiment generates a 3D image of the scene according to the depth information of the points in the scene, and obtains depth information of each point in the scene corresponding to each pixel in the following manner: During the exposure period, the charges obtained by photoelectric conversion of the light reflected by the points are distributed to at least two charge collection areas according to a preset distribution rule. The distribution rule is used to determine the variation function of change over time of the ratio of the amount of charge collected by each charge collection area to the sum of charge collected by all charge collection area per unit time. Moreover, for the same pixel, the charge collection variation functions of each charge collection area A are different from each other. Based on the distribution result, the depth information of each point in the scene corresponding to the pixel is determined. The above method of acquiring depth information utilizes the difference in the ratio of the number of charges collected by multiple charge collection areas for a certain pixel at different times during the exposure, so that the electrical signal after photoelectric conversion can not only characterize the total exposure of the pixel, but also represent the depth information of the points in the scene, and accordingly the depth information of each point in the scene corresponding to each pixel in the image can be acquired.

Figure 3:
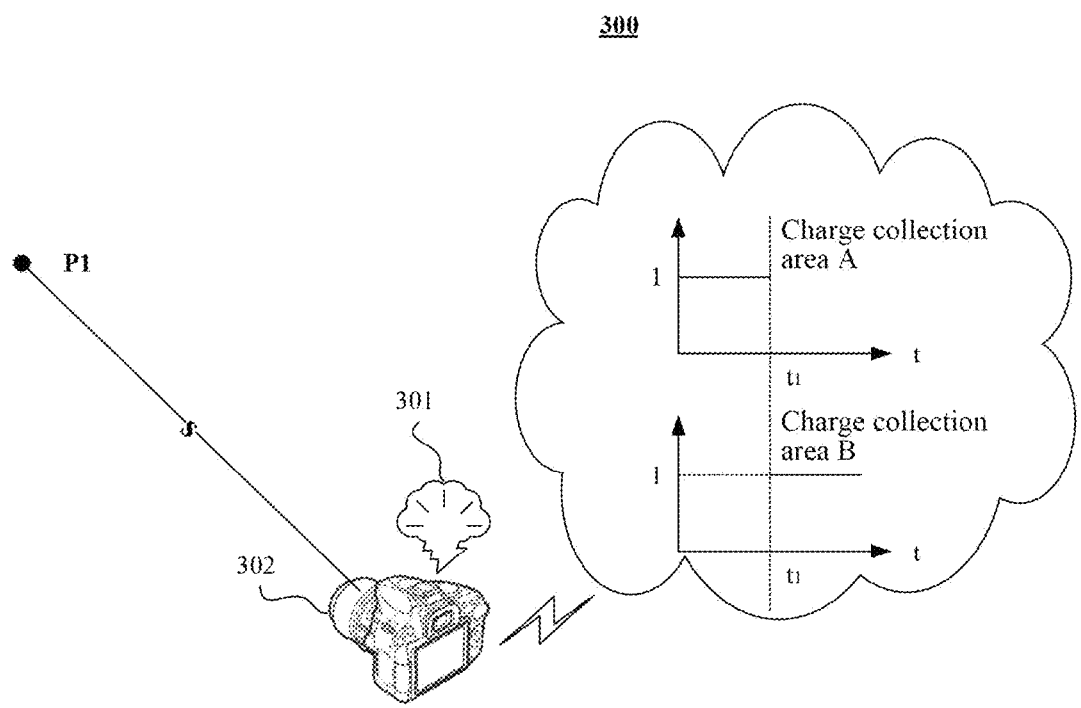
FIG. 3 is a schematic diagram of an application scenario of the 3D imaging method according to the present application.

Continue to refer to FIG. 3, which is a schematic diagram 300 of an application scenario of the 3D imaging method according to this embodiment.

In the application scenario shown in FIG. 3, for example, it is desirable to distinguish between the part that is more than the preset distance $S_0$ from the image capture device and the part that does not exceed the preset distance $S_0$ in the scene. Then, for the two charge collection areas A and B that receive the charges obtained by photoelectric conversion of the light reflected by each pixel, the charge distribution rules of the two charge collection areas can be set first.

Specifically, in this application scenario, it is desirable to distinguish between the part that is more than the preset distance $S_0$ from the image capture device and the part that does not exceed the preset distance $S_0$ in the scene. Then, suppose that in this application scenario, the distance between the illumination source 301 and the image capture device 302 is much smaller than the distance between the illumination source 301 and any point in the scene according to the formula 2S=C·t. When the distance S=$S_0$ and the speed of light C is constant, the time required for the light reflected by the pixel $S_0$ between the image capture device and the image capture device to reach the photoelectric converter of the image capture device in the scene can be calculated as $t_1=2S_0/C$.

In this way, one of the charge collection areas A and B (for example, the charge collection area A shown in FIG. 3) can be used for the charge collection before the time $t_1$, which is the critical point. After $t_1$, the other of the charge collection areas A and B (for example, the charge collection area B shown in FIG. 3) is used for the charge collection. Thus, according to the charge collection area of each pixel where the charge is collected, it can be determined whether the distance between the pixel and the image capture device exceeds $S_0$.

For example, in FIG. 3, the light reflected from the pixel $P_1$ is received in the charge collection area B after being converted by the photoelectric converter. Then, it can be determined that the distance S≥$S_0$ between the pixel $P_1$ and the image capture device.

It can be understood that, using the 3D imaging method of this embodiment, in order to obtain the distance from each point in the scene to the image capture device, for each pixel, the amount of charge collected in each charge collection area corresponding to the pixel is the distribution functions which vary with time and can be different continuous functions or piecewise continuous functions.

Figure 4:
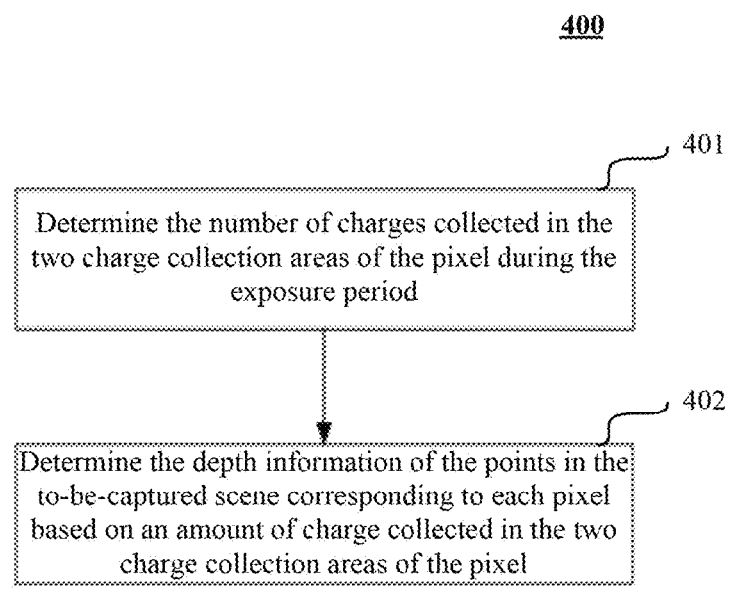
FIG. 4 is a flow chart of an implementation manner of determining the depth information of a point in the to-be-captured scene corresponding to the pixel based on the distribution result in the 3D imaging method according to the present application.

In some optional implementation manners of this embodiment, the process 400 shown in FIG. 4 may be used to determine the depth information of each point in the scene corresponding to the pixel based on the distribution result. In the optional implementation shown in FIG. 4, the pixel for which the depth information is obtained has two charge collection areas.

Specifically, in step 401, the number of charges collected in the two charge collection areas of the pixel during the exposure period is determined.

In step 402, the depth information of each point in the scene corresponding to the pixel is determined based on the number of charges collected in the two charge collection areas of the pixel.

It is understandable that, in order to make the illumination light emitted by the illumination source be captured by the image sensing unit of the image capture device, the overlap of the time period during which the illumination light is reflected to the image capture device via a point in the scene and the exposure time period is not empty. In other words, assuming that the exposure period is [0,T], then within the time interval [0,T], there is at least one point in the scene, such that after the illumination light is reflected by this point, it can be captured by the image sensing unit of the image capture device in the time interval [0, T].

Hereinafter, the process shown in FIG. 4 will be further described in conjunction with FIG. 5A, FIG. 5B, and FIG. 5C.

Figure 5A:
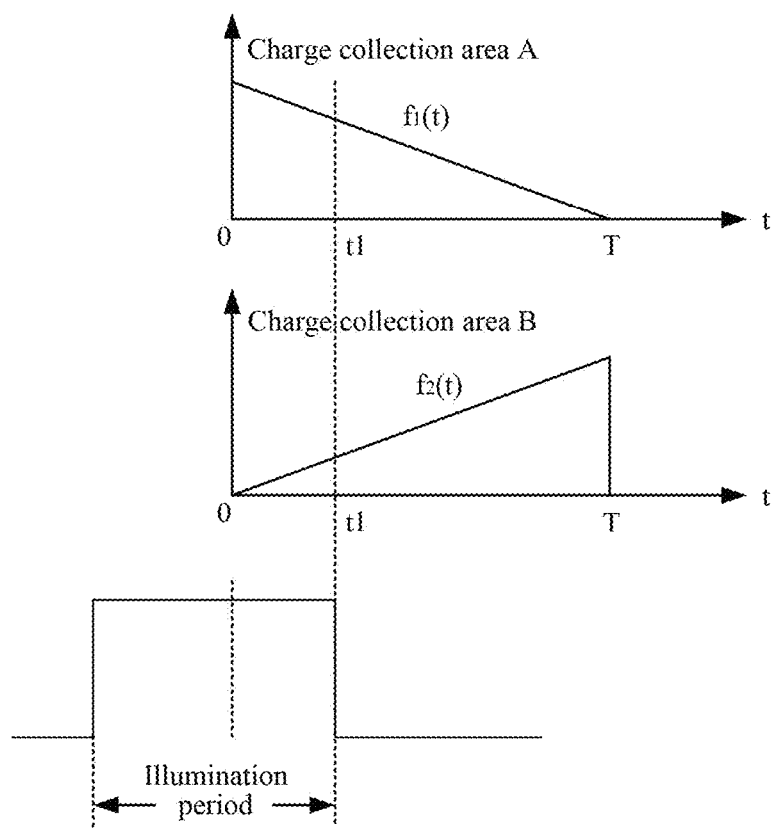
FIG. 5A-5C show the application scenario of determining the distance from the point in the to-be-captured scene to the image capture device in the 3D imaging method according to the present application.

In the application scenario shown in FIG. 5A, the illumination light emitted by the illumination source at a certain time $t=-t_0$ (the light-emitting moment is before the time origin, controlled by the system and is a known constant), and the illumination light pulse is a square pulse with a wide width of T. Under the illumination, the light returned from the object point corresponding to each pixel in the scene has the same pulse width. Here, a wide pulse width can be understood as meaning that the pulse width is not much smaller than the duration of the exposure period. For example, the pulse width is greater than or equal to 0.1 nanosecond (ns) and less than 0.1 second.

In the application scenario shown in FIG. 5A, it is necessary to determine the last time $t_1$ at which the light returned by the object point corresponding to a certain pixel is received by the image capture device, and then the distance from the point to the image capture device is calculated. The distance is used as its depth information.

Thus, the number of charges $Q_1$ collected by the charge collection area A of the pixel and the number of charges $Q_2$ collected by the charge collection area B of the pixel can be detected respectively. The ratio of $Q_1$ to $Q_2$ refers to such a ratio of the integral $I_1$ of $f_1(T)$ (a function whose collection ratio changes with time) in the period of $0-T_1$, to the integral $I_2$ of $F_2(t)$ (a function whose collection ratio changes with time) in the period of $0-T_1$. In addition, when the emitted light is a square wave, q(t) can be regarded as a constant. That is:

$$\frac{Q_1}{Q_2} = \frac{\int_0^T q(t)f_1(t)dt}{\int_0^T q(t)f_2(t)dt} = \frac{\int_0^{T_1} q(t)f_1(t)dt}{\int_0^{T_1} q(t)f_2(t)dt} = \frac{\int_0^{T_1} f_1(t)dt}{\int_0^{T_1} f_2(t)dt}$$

And because the expressions of $f_1(t)$ and $f_2(t)$ are predetermined, according to the formula $Q_1/Q_2=I_1/I_2$, the time $t_1$ corresponding to $I_1$ and $I_2$ can be solved. The flight time of the light wave is tof=$t_0+t_1-\tau$.

Further, assuming that in the application scenario shown in FIG. 5A, the illumination source is set on the image capture device, according to the formula 2S=C·t, substituting the calculated tof into it, the distance from the point to the image capture device can be obtained $s_1$=C·tof/2.

Figure 5B:
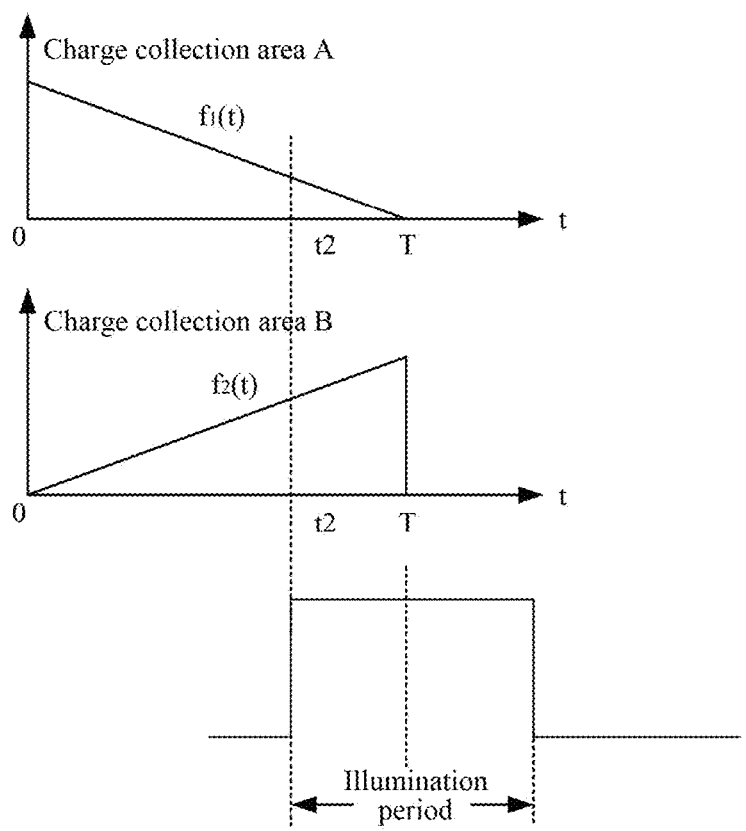

Furthermore, referring to FIG. 5B, similar to the application scenario shown in FIG. 5A, in FIG. 5B, the illumination light also has a wide pulse width.

In the application scenario shown in FIG. 5B, the exposure has already started at the start time of receiving light (time $t_2$), and the illumination has not ended at the end of exposure time (time T). Therefore, in the application scenario shown in FIG. 5B, it is necessary to determine the initial time $t_2$ at which the light reflected by a certain point is received by the image capture device, and then calculate the distance from the point to the image capture device as its depth.

Thus, similar to the embodiment shown in FIG. 5A, the number of charges Q collected by the charge collection area A of the pixel and the number of charges $Q_2$ collected by the charge collection area B of the pixel can be detected respectively. The ratio of $Q_1$ to $Q_2$ refers to such a ratio of the integral $I_1$ of $f_1(T)$ (a function whose collection ratio changes with time) in the period of $t_2-T$, to the integral $I_2$ of $f_2(t)$ (a function whose collection ratio changes with time) in the period of $t_2-T$. In addition, when the emitted light is a square wave, q(t) can be regarded as a constant. That is:

$$\frac{Q_1}{Q_2} = \frac{\int_0^T q(t)f_1(t)dt}{\int_0^T q(t)f_2(t)dt} = \frac{\int_{t_2}^T q(t)f_1(t)dt}{\int_{t_2}^T q(t)f_2(t)dt} = \frac{\int_{t_2}^T f_1(t)dt}{\int_{t_2}^T f_2(t)dt}$$

Because the expressions of $f_1(t)$ and $f_2(t)$ are predetermined, according to the formula $Q_1/Q_2=I_1/I_2$, the time $t_2$ corresponding to $I_1$ and $I_2$ can be calculated. The flight time of light waves is $tof=t_0+t_2$.

Further, it is still assumed that in the application scenario shown in FIG. 5B, the illumination source is set on the image capture device. According to the formula $2S=C\cdot t$, substituting the solved tof into it, the distance from the pixel to the image capture device $s_2=C\cdot tof/2$ can be obtained.

Figure 5C:
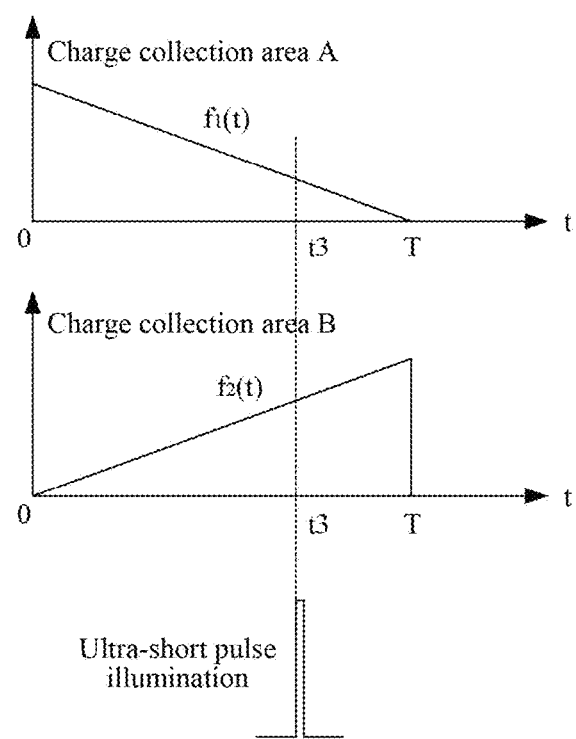

Different from the application scenarios shown in FIGS. 5A and 5B, in FIG. 5C, the illumination light emitted by the illumination source has short pulse width. In other words, the pulse width of the illumination light is much smaller than the duration of the exposure period. For example, the pulse width of the illumination light is in the range of 0.01 ps~0.1 μs.

In this application scenario, the number of charges $Q_1$ collected by the charge collection area A of the pixel and the number of charges $Q_2$ collected by the charge collection area B of the pixel can be detected respectively. And, the ratio of $Q_1$ to $Q_2$ is the ratio of the function values of $f_1(t)$ and $f_2(t)$ at $t_3$, namely: $Q_1/Q_2=f_1(t_3)/f_2(t_3)$.

Because the expressions of $f_1(t)$ and $f_2(t)$ are predetermined, according to the formula $Q_1/Q_2=f_1(t_3)/f_2(t_3)$, time $t_3$ can be calculated. The flight time of light waves is $tof=t_0+t_3$.

Further, it is still assumed that in the application scenario shown in FIG. 5C, the illumination source is set on the image capture device. According to the formula $2S=C\cdot t$, substituting the solved tof into it, the distance from the pixel to the image capture device $s_3=C\cdot tof/2$ can be obtained.

Although the illuminating light emitted by the illuminating source of FIGS. 5A-5C is a square wave, those skilled in the art can understand that since q (t) is proportional to the illuminating light emitted by the illuminating source, the above method disclosed in this application can be adopted to the non-square wave pulsed illumination source to determine the time of flight.

As can be seen from the above description, the variation function of the collection ratio of each charge collection area over time is different from each other. Accordingly, for a certain pixel corresponding to a point in the scene, by detecting the number of collected charges of the two charge collection areas of the pixel and by using the known function of the collection ratio of each charge collection area with time and the function of the illumination intensity with time, the moment when the pixel receives the illumination light can be calculated, and then the distance from the point to the image capture device may be determined.

Figure 6:
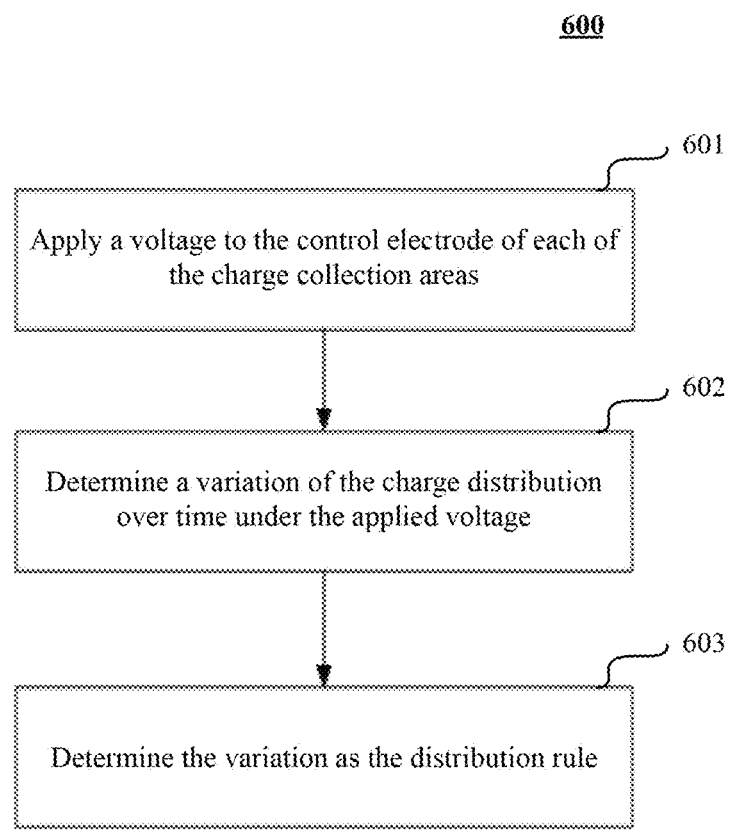
FIG. 6 is an implementation manner of generating a charge distribution rule in the 3D imaging method of the present application.

In addition, in the 3D imaging method of the present application, the method shown in FIG. 6 may be used to obtain the distribution result for charge distribution to each charge collection area for a certain pixel. Here, it is assumed that during the charge collection period in the charge collection area, the intensity of the illumination light emitted by the illumination source is constant as the unit intensity value.

Specifically, in step 601, a voltage is applied to the control electrode of each charge collection area, wherein the voltage applied to the control electrode of each charge collection area has a mutually different voltage-time function.

For example, if each pixel has two charge collection areas (charge collection area A and charge collection area B), then a voltage that linearly changes from $V_0$ to 0 can be applied to the control electrode of the charge collection area A. Accordingly, a voltage linearly varying from 0 to $V_0$ can be applied to the control electrode of the charge collection area B. Also, the absolute value of the rate of change of the voltage applied to the control electrode of the charge collection area A is equal to the absolute value of the rate of change of the voltage applied to the control electrode of the charge collection area B.

Next, in step 602, the change relationship of the charge distribution over time under the action of the applied voltage is determined.

For example, during the voltage change period, for each charge collection area, the number of charges collected is collected every interval $\Delta t$. For a collection time t, if it is determined that the number of charges currently collected is $q_t$, then the difference between qt and the number of charges $q_t-1$ that have been collected at the previous collection time $t-\Delta_t$ is $\Delta q=q_t-q_t-1$ as the number of charges collected at the time t.

Next, in step 603, the distribution rule is used as the distribution rule.

Through the above step 602, the number of charges collected at each collection time can be determined, thereby obtaining the corresponding discrete point sequence $[(q_0, t_0), (q_1, t_1), \ldots, (q_n, t_n)]$. By curve fitting the discrete point sequence, the distribution rule f(t) of the corresponding charge collection area can be obtained.

It can be understood that in step 602, the shorter the collection interval $\Delta t$ is, the more accurate the final fitting relationship will be. Accordingly, when the distribution results obtained by the above steps 601 to 603 are applied, the depth information obtained by the 3D imaging method is also more accurate.

In addition, this application also discloses a depth camera, including an image sensor: a photoelectric converter, a charge collector, and a processor.

The image sensor may include a plurality of sensing pixel units, and each sensing pixel unit collects light signals of points in the scene.

The photoelectric converter may include a photoelectric conversion unit corresponding to each sensing pixel unit, and each photoelectric conversion unit is used to convert the light signal received by each pixel into electric charge.

The charge collector includes a charge collection unit corresponding to each sensing pixel unit, and each charge collection unit is used to determine an electrical signal obtained by photoelectric conversion. Wherein, the charge collection unit has at least one first charge collection unit, the first charge collection unit includes at least two charge collection areas, and the first charge collection unit is used to transfer the charge obtained by photoelectric conversion to the charge collection areas according to a preset distribution rule. The distribution rule is used to determine the variation function of the ratio of the amount of charge collected by each charge collection area to the sum of charge collected by all charge collection area per unit time. Moreover, for the same pixel, the charge collection variation functions of each charge collection area are different from each other.

The processor may be used to determine the depth information of the points in the scene corresponding to the pixels having at least two charge collection areas according to the distribution result.

In the depth camera of this embodiment, the working flow of the first charge collection unit and the processor can refer to the above-mentioned 3D imaging method, which will not be repeated here.

It should be noted that in some optional implementations of the depth camera of this embodiment, the processor may be provided in the body of the depth camera (for example, the processor may be a processing chip integrated on the body of the depth camera).

Alternatively, in other optional implementation manners of the depth camera of this embodiment, the processor may also be set separately. For example, the processor may be provided in a terminal device or a server that is communicatively connected with the depth camera body.

In addition, it can be understood that if the depth camera of this embodiment is a color camera, there may be multiple sensing pixel units for collecting the light signal of each pixel. In addition, filters may be provided on these sensing pixel units to collect light signals in different wavelength ranges from the points. For example, each pixel may have an R (Red) sensing pixel unit for collecting red light from the corresponding point in the scene, a G (Green) sensing pixel unit for collecting green light from the point, and a B (Blue) sensing pixel unit for collecting blue light from it.

Figure 7:
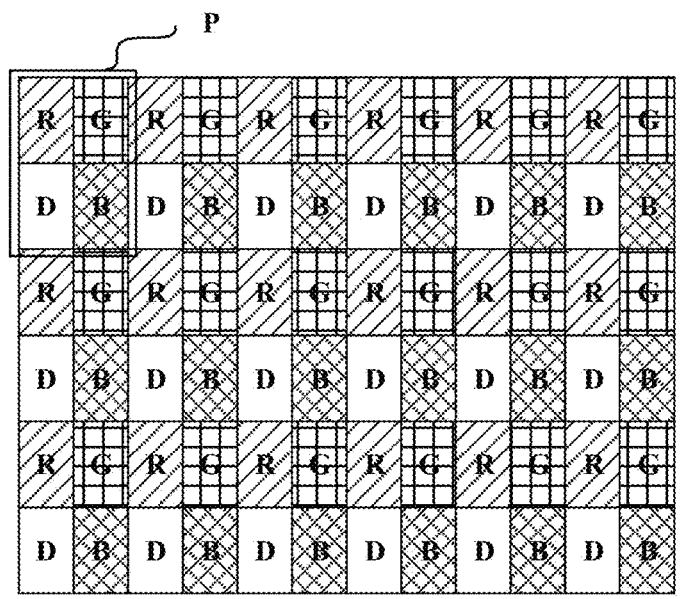
FIG. 7 is a schematic arrangement of sensing pixel units in the depth camera of the present application.

In addition, in some optional implementation manners of this embodiment, the sensing pixel units of the depth camera may be arranged in the manner 700 shown in FIG. 7.

Specifically, for a certain pixel P, it may have a sensing pixel unit R for collecting red light, a sensing pixel unit G for collecting green light, a sensing pixel unit B for collecting blue light, and a sensor pixel unit D for collecting depth information. Each sensing pixel unit is connected to a photoelectric converter corresponding to the photoelectric conversion of the light signal collected by the sensing pixel unit.

For the sensing pixel units R, G, and B of the pixel P, the photoelectric converters connected to them can be determined according to the value of the electrical signal (for example, current/voltage) after converting the light signal received by each into an electrical signal The RGB pixel value of this pixel.

As for the sensing pixel unit D of the pixel P, the corresponding charge collection unit is the first charge collection unit in the charge collector. In other words, the photoelectric conversion unit of the sensing pixel unit D is connected with at least two charge collection areas. After the photoelectric conversion unit converts the received optical signal into an electrical signal, the electrical signal can be further transferred to the charge collection areas in the first charge collection unit. Furthermore, the processor can determine the depth information of the pixel P according to the distribution result of the charge received by each charge collection area.

In some alternative implementations, each charge collection unit may include two charge collection areas. In these optional implementation manners, the processor may further determine the depth information of each point in the scene corresponding to the pixel based on the number of charges collected by the two charge collection areas of the pixel.

In some optional implementations, the depth camera further includes a shutter. It is understandable that by controlling the opening and closing of the shutter and/or by controlling the on period of the illumination light emitted by the illumination source, the illumination light emitted by the illumination source can be reflected to the image capture device through the points in the scene. The intersection of the exposure period and the illumination is not empty to ensure that the charge collection unit can collect charges.

In these alternative implementations, the processor may further determine the number of charges collected by the two charge collection areas of the pixel during the exposure period, and based on the number of charges collected by the two charge collection areas of the pixel, the depth information of the points in the scene corresponding to the pixel may be determined; where the exposure period is the period from the shutter opening to the shutter closing. If the time when the shutter is opened is the first time and the time when the shutter is closed is the second time, then at the first time, at least part of the illuminating light has not yet returned to the image sensor from the scene, and at the second time, at least part of the illuminating light has already returned to the image sensor from the scene.

In this way, in these alternative implementations, the time required for the light reflected by each point in the scene to reach the image sensor can be distinguished, so that the depth information of the points in the scene can be determined according to that time.

In addition, in some optional implementations, the depth camera also includes an illumination source that emits illumination light. In this way, the distance between the depth camera and the illumination source can be regarded as 0. Therefore, in the above formula (3), L=0, g (Z)=Z, therefore, the equation 2S=C·t to calculate the distance S between the depth camera and the point in the scene.

In some optional implementation manners, the distribution rule is realized by: applying a voltage to the control electrode of each charge collection area, wherein the voltage applied to the control electrode of each charge collection area has a mutually different voltage-time function; determining the charge distribution variation over time under the applied voltage; and regarding the determined charge distribution variation as the distribution rule.

In some alternative implementations, in the depth camera of this embodiment, the sensing device is a charge coupled device (CCD), or a complementary metal oxide semiconductor (CMOS) device.

Figure 8:
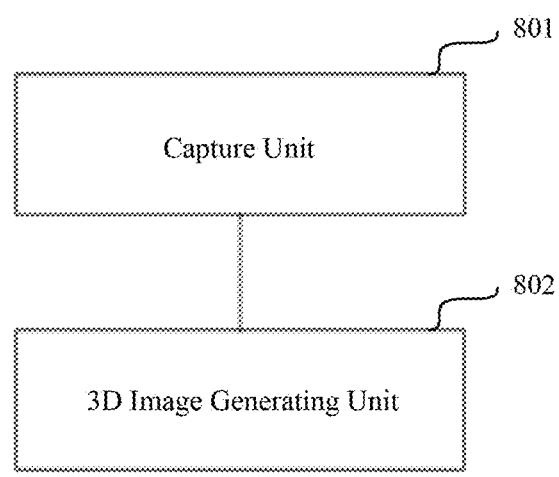
FIG. 8 is a structural diagram of an embodiment of a 3D imaging device according to the present application.

With further reference to FIG. 8, as an implementation of the methods shown in the above figures, this application provides an embodiment of a 3D imaging device. The device embodiment corresponds to the method embodiment shown in FIG. 2 and can be used in various electronic devices.

As shown in FIG. 8, the 3D imaging apparatus of this embodiment includes a capture unit 801 and a 3D image generating unit 802.

Here, the capture unit 801 may be configured to acquire depth information of the points in a to-be-captured scene corresponding to at least one pixel.

The 3D image generating unit 802 may be configured to generate a 3D image of the to-be-captured scene based on the acquired depth information.

In addition, for the points in the to-be-captured scene corresponding to each pixel, the depth information can be obtained by: distributing, during the exposure period, charges obtained by photoelectric conversion of received light reflected by each of the points to at least two charge collection areas according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and determining, based on a result of the distributing, the depth information of the each of the points in the to-be-captured scene corresponding to the at least one pixel.

In some alternative implementations, each of the pixels corresponding to the points in the to-be-captured scene has two charge collection areas.

In these alternative implementations, determining, based on a result of the distributing, the depth information of the each of the points in the to-be-captured scene corresponding to the pixel may further include: determining, based on an amount of charge collected in the two charge collection areas of the pixel, the depth information of the points in the to-be-captured scene corresponding to each pixel.

In some alternative implementations, determining, based on a result of the distributing, the depth information of the each of the points in the to-be-captured scene corresponding to the at least one pixel may include: determining, during an exposure period, a number of charges collected in the two charge collection areas of the pixel; and determining, based on the determined number, the depth information of the points in the scene corresponding to the pixel.

In some alternative implementations, an intersection of a time period, during which an illumination light emitted by an illumination source is reflected to an image capture device by the points in the to-be-captured scene, and a time period for exposure of the device is not empty.

In some alternative implementations, the illumination light may have a short pulse width.

In other alternative implementations, the illumination light may have a long pulse width.

In some alternative implementations, the distribution rule may be determined by: applying a voltage to control electrodes of each of the charge collection areas, wherein the applied voltage has different voltage-time variation functions from each other; determining a variation of the charge distribution over time under the applied voltage; and determining the variation as the distribution rule.

Figure 9:
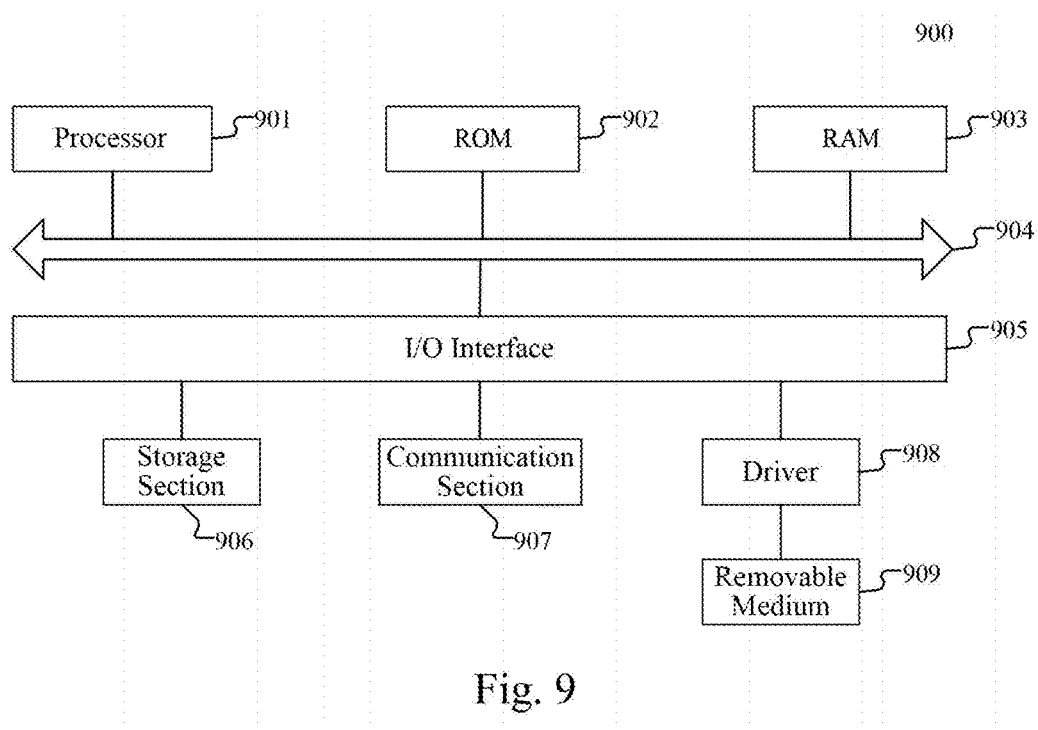
FIG. 9 is a schematic structural diagram of a computer system of an electronic device suitable for implementing the 3D imaging method of an embodiment of the present application.

Next, referring to FIG. 9, it shows a schematic structural diagram of a computer system 900 of an electronic device suitable for implementing the 3D imaging method of the embodiment of the present application. The electronic device shown in FIG. 9 is only an example, and should not bring any limitation to the functions and scope of use of the embodiments of the present application.

As shown in FIG. 9, the computer system 900 includes one or more processors 901 (for example, CPU), which can be loaded into a random access memory (RAM) according to a program stored in a read-only memory (ROM) 902 or loaded from a storage part 906). The program in 903 executes various appropriate actions and processing. In the RAM 903, various programs and data required for the operation of the system 900 are also stored. The processor 901, the ROM 902, and the RAM 903 are connected to each other through a bus 904. An input/output (I/O) interface 905 is also connected to the bus 904.

The following components are connected to the I/O interface 905: a storage section 906 including a hard disk and the like; and a communication section 907 including a network interface card such as a LAN card, a modem, and the like. The communication section 907 performs communication processing via a network such as the Internet. The driver 908 is also connected to the I/O interface 905 as needed. A removable medium 909, such as a magnetic disk, an optical disk, a magneto-optical disk, a semiconductor memory, etc., is installed on the drive 908 as needed, so that the computer program read therefrom is installed into the storage portion 906 as needed.

In particular, according to an embodiment of the present disclosure, the process described above with reference to the flowchart can be implemented as a computer software program. For example, the embodiments of the present disclosure include a computer program product, which includes a computer program carried on a computer-readable medium, and the computer program contains program code for executing the method shown in the flowchart. In such an embodiment, the computer program may be downloaded and installed from the network through the communication part 907, and/or installed from the removable medium 909. When the computer program is executed by the central processing unit (CPU) 901, the above-mentioned functions defined in the method of the present application are executed. It should be noted that the computer-readable medium described in this application may be a computer-readable signal medium or a computer-readable storage medium or any combination of the two. The computer-readable storage medium may be, for example, but not limited to, an electrical, magnetic, optical, electromagnetic, infrared, or semiconductor system, device, or device, or any combination of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The computer program code used to perform the operations of this application can be written in one or more programming languages or a combination thereof. The programming languages include object-oriented programming languages—such as Java, Smalltalk, C++, and also conventional Procedural programming language—such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the drawings illustrate the possible implementation of the system architecture, functions, and operations of the system, method, and computer program product according to various embodiments of the present application. In this regard, each block in the flowchart or block diagram can represent a module, program segment, or part of code, and the module, program segment, or part of code contains one or more for realizing the specified logic function executable instructions. It should also be noted that, in some alternative implementations, the functions marked in the block may also occur in a different order from the order marked in the drawings. For example, two blocks shown in succession can actually be executed substantially in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in the present application can be implemented in software or hardware. The described unit may also be provided in the processor, for example, it may be described as: a processor includes a capture unit and a 3D image generation unit. Among them, the names of these units do not constitute a limitation on the unit itself under certain circumstances. For example, the capture unit can also be described as "a unit for acquiring the depth information of the points in the scene corresponding to at least one pixel."

As another aspect, the present application also provides a computer-readable medium, which may be included in the device described in the above-mentioned embodiments; or it may exist alone without being assembled into the device. The above-mentioned computer-readable medium carries one or more programs. When the above-mentioned one or more programs are executed by the device, the device acquires the depth information of the points in the scene corresponding to at least one pixel. To generate a 3D image of the scene, the depth information is obtained in the following manner for a point in the scene corresponding to at least one pixel: during the exposure period, the light reflected by the point is photo-electrically converted. The obtained charges are distributed to at least two charge collection areas according to the preset distribution rules. The distribution rules are used to determine the charge collection variation functions of the changes over time of the ratio of the amount of charge collected by each charge collection area to the total amount of charges collected by all charge collection area per unit time. In addition, for the same pixel, the variation function of each charge collection area is different from each other. Based on the distribution result, the depth information of the points in the scene corresponding to the pixel is determined.

The above description is only a preferred embodiment of the present application and an explanation of the applied technical principles. Those skilled in the art should understand that the scope of the invention involved in this application is not limited to the technical solution formed by the specific combination of the above technical features, and should also cover other technical solutions formed by any combination of the above technical features or their equivalent features without departing from the concept of the invention, such as, technical solutions formed by replacing the features as disclosed in the present disclosure with (but not limited to), technical features with similar functions.

What is claimed is:

1. A 3D imaging method, comprising:
acquiring depth information of points in a to-be-captured scene corresponding to at least one pixel;
generating a 3D image of the to-be-captured scene based on the acquired depth information;
wherein, for each of the points in the to-be-captured scene corresponding to the at least one pixel, the depth information is obtained by:
distributing, during the exposure period, charges obtained by the pixel by photoelectric conversion of received light reflected by each of the points to at least two charge collection areas associated to the pixel according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and
determining, based on a result of the distributing, the depth information of the each of the points in the to-be-captured scene corresponding to the at least one pixel.

2. The method according to claim 1, wherein each of the pixels, from which the depth information is obtained, has at least two charge collection areas; and
wherein, the determining further comprises:
determining, based on an amount of charge collected in the at least two charge collection areas of the pixel, the depth information of the points in the to-be-captured scene corresponding to each pixel.

3. The method according to claim 2, wherein the determining further comprises:
determining, during an exposure period, a number of charges collected in the at least two charge collection areas of the pixel; and
determining, based on the determined number, the depth information of the points in the scene corresponding to the pixel.

4. The method according to claim 3, wherein:
an intersection of a time period, during which an illumination light emitted by an illumination source is reflected to an image capture device by the points in the to-be-captured scene, and a time period for exposure of the device is not empty.

5. The method according to claim 4, wherein the illumination light has a short pulse width shorter than or equal to 10 ns.

6. The method according to claim 4, wherein the illumination light has a long pulse width longer than 10 ns.

7. The method according to claim 3, wherein the distribution rule is determined by:
applying a voltage to control electrodes of each of the charge collection areas, wherein the applied voltage has different voltage-time variation functions from each other;
determining a variation of the charge distribution over time under the applied voltage; and
determining the variation as the distribution rule.

8. A depth camera, comprising:
an image sensor, having a plurality of sensing pixel units, each of which collects light signals of points in a to-be-captured scene;
a photoelectric converter, comprising a photoelectric conversion unit corresponding to each of the sensing pixel units, wherein each photoelectric conversion unit is used to convert the light signals collected by each pixel into electric charges;
a charge collector, comprising a charge collection unit corresponding to each of the sensing pixel units, and each charge collection unit is used to determine an amount of electrical signals obtained via photoelectric conversion of the photoelectric converter, wherein the charge collection unit has at least one first charge collection unit having at least two charge collection areas and used to distribute charges obtained by the photoelectric conversion to charge collection areas of the charge collection unit according to a distribution rule, and wherein the distribution rule is used to determine charge collection variation functions of changes over time of a ratio of an amount of charges collected in each charge collection area to a total amount of charge collected in all charge collection areas of the charge collection unit per unit time, and wherein for a same pixel, the variation functions are different from each other;
a processor, configured to determine the depth information of the points in the to-be-captured scene corresponding to the pixels having at least two charge collection areas based on a result of the distributing.

9. The depth camera according to claim 8, wherein each charge collection unit comprises at least two charge collection areas; and
wherein the processor further determines the depth information of the points in the to-be-captured scene corresponding to the pixel based on a number of charges collected by the at least two charge collection areas of the pixel.

10. The depth camera according to claim 9, wherein the depth camera further comprises a shutter;
the processor is further configured to:
determine a number of charges collected by the two charge collection areas of the pixel during an exposure period, and
determine the depth information of the points in the to-be-captured scene corresponding to the pixel based on the determined number of the collected charges,
wherein,
the exposure period is a period from a time when the shutter is opened to when the shutter is closed;
at a first moment when the shutter is opened, at least part of the illumination light has not yet returned to the image sensor from the to-be-captured scene; and
at a second moment when the shutter is closed, at least part of the illumination light has returned to the image sensor from the to-be-captured scene.

11. The depth camera according to claim 9, wherein the depth camera further comprises an illumination source that emits illumination light.

12. The depth camera according to claim 10, wherein the distribution rule is determined by:
applying a voltage to control electrodes of each of the charge collection areas, wherein the applied voltage has different voltage-time variation functions from each other;
determining a variation of the charge distribution over time under the applied voltage; and
determining the variation as the distribution rule.

13. The depth camera according to claim 8, wherein each of the sensing pixel units is selected from group consisting of a charge coupled device unit and a CMOS sensor unit.

14. A 3D imaging device, comprising:
a capture unit, configured to acquire depth information of points in a to-be-captured scene corresponding to at least one pixel;
a 3D image generating unit, configured to generate a 3D image of the to-be-captured scene based on the acquired depth information;
wherein, for each of the points in the to-be-captured scene corresponding to the at least one pixel, the depth information is obtained by:
distributing, during the exposure period, charges obtained by the pixel by photoelectric conversion of received light reflected by each of the points to at least two charge collection areas associated to the pixel according to a preset distribution rule, wherein the distribution rule is used to determine charge collection variation functions of changes over time of a ratio of an amount of charges collected in each charge collection area to a total amount of charges collected in all charge collection areas per unit time, and wherein for a same pixel, the variation functions of each charge collection area are different from each other; and
determining, based on a result of the distributing, the depth information of the each of the points in the to-be-captured scene corresponding to the at least one pixel.

15. The device according to claim 14, wherein each of the pixels, from which the depth information is obtained, has at least two charge collection areas; and
wherein, the determining further comprises:
determining, based on an amount of charge collected in the two charge collection areas of the pixel, the depth information of the points in the to-be-captured scene corresponding to each pixel.

16. The device according to claim 15, wherein:
the determining further comprises:
determining, during an exposure period, a number of charges collected in the two charge collection areas of the pixel;
determining, based on the determined number, the depth information of the points in the scene corresponding to the pixel.

17. The device according to claim 16, wherein:
an intersection of a time period, during which an illumination light emitted by an illumination source is reflected to an image capture device by the points in the to-be-captured scene, and a time period for exposure of the device is not empty.

18. The device according to claim 17, wherein the illumination light has a short pulse width shorter than or equal to 10 ns.

19. The device according to claim 17, wherein the illumination light has a long pulse width longer than 10 ns.

20. The device according to claim 16, wherein the distribution rule is determined by:
applying a voltage to control electrodes of each of the charge collection areas, wherein the applied voltage has different voltage-time variation functions from each other;
determining a variation of the charge distribution over time under the applied voltage; and
determining the variation as the distribution rule.

* * * * *